Aug. 30, 1960

R. G. LAUCHER ET AL 2,950,595

THRUST REVERSER

Filed Nov. 1, 1954

RICHARD G. LAUCHER
JOHN S. WINTER
EVERETT A. JOHNSTON
INVENTORS

BY R. E. Geauque

ATTORNEY

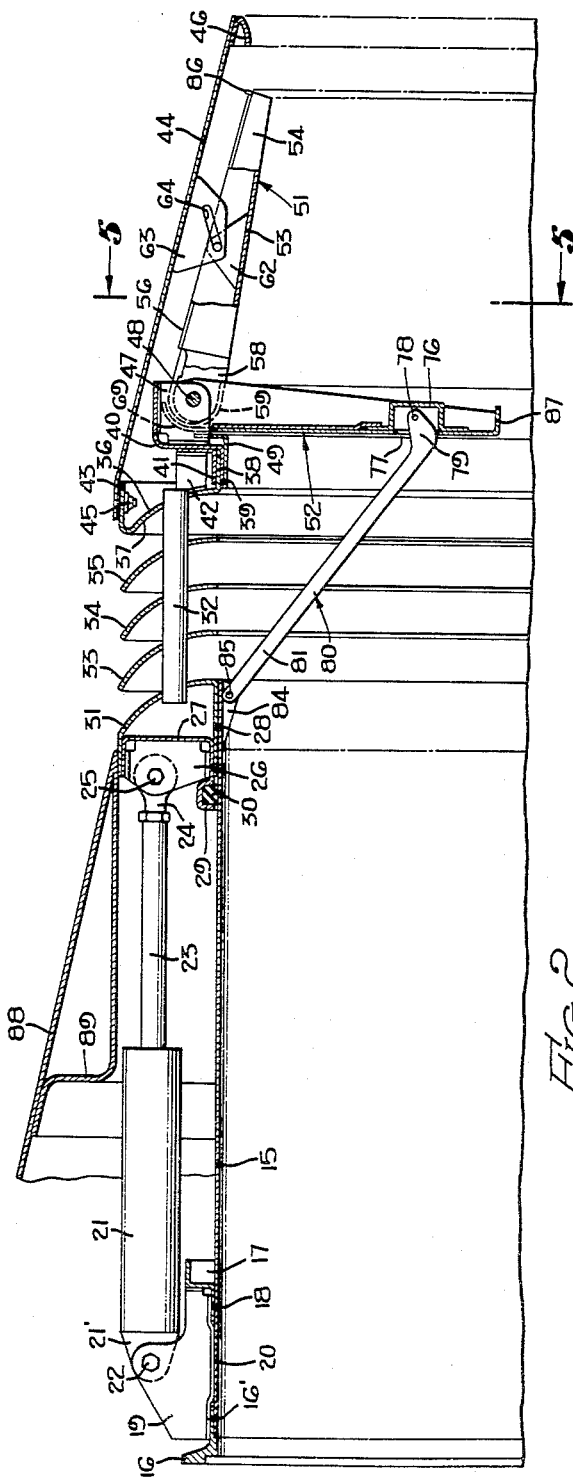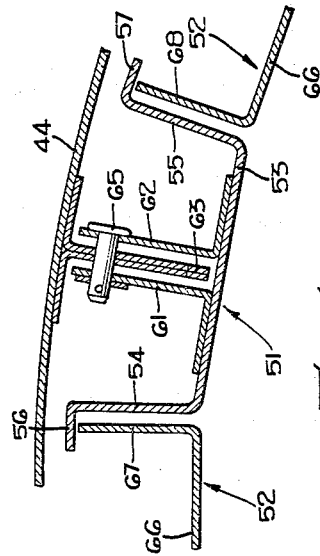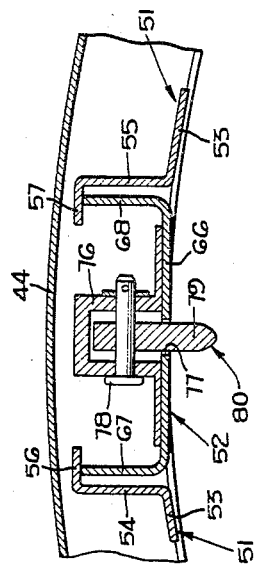

RICHARD G. LAUCHER
JOHN S. WINTER
EVERETT A. JOHNSTON
INVENTORS

Aug. 30, 1960   R. G. LAUCHER ET AL   2,950,595
THRUST REVERSER

Filed Nov. 1, 1954   7 Sheets-Sheet 5

RICHARD G. LAUCHER
JOHN S. WINTER
EVERETT A. JOHNSTON
INVENTORS

BY  R. E. Geangue

ATTORNEY

Aug. 30, 1960 R. G. LAUCHER ET AL 2,950,595
THRUST REVERSER
Filed Nov. 1, 1954 7 Sheets-Sheet 6
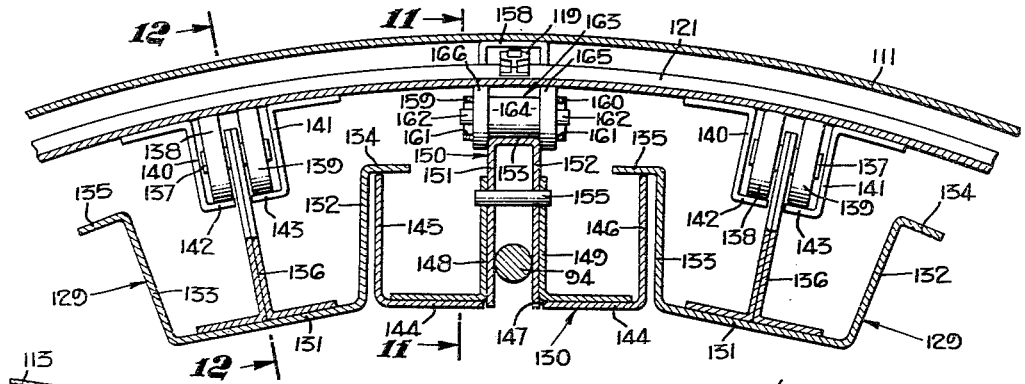
Fig. 10.
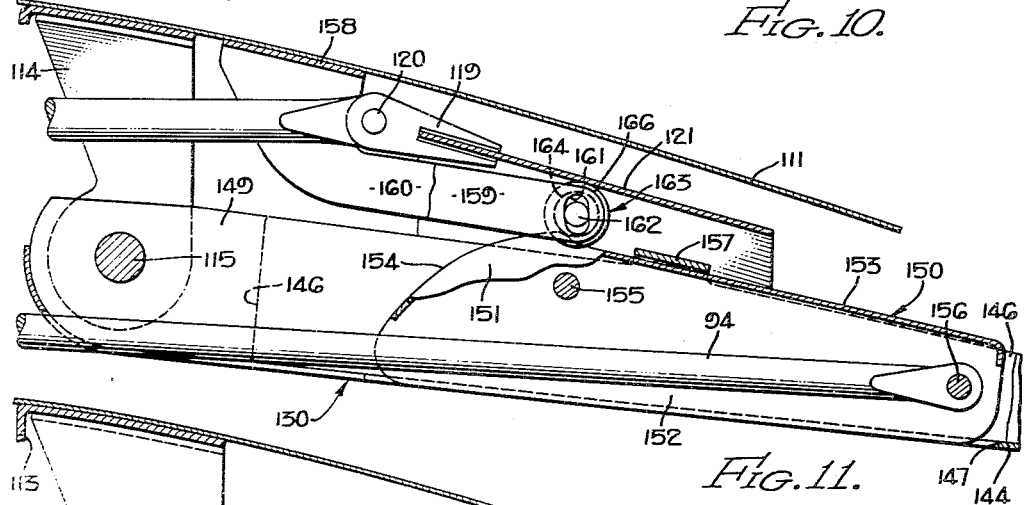
Fig. 11.
Fig. 12.
RICHARD G. LAUCHER
JOHN S. WINTER
EVERETT A. JOHNSTON
INVENTORS
BY R. E. Geangue
ATTORNEY Aug. 30, 1960

R. G. LAUCHER ET AL 2,950,595

THRUST REVERSER

Filed Nov. 1, 1954

RICHARD G. LAUCHER
JOHN S. WINTER
EVERETT A. JOHNSTON
INVENTORS

BY R. E. Geauque

ATTORNEY

United States Patent Office 2,950,595
Patented Aug. 30, 1960

2,950,595

THRUST REVERSER

Richard G. Laucher, Canoga Park, and John S. Winter, and Everett A. Johnston, Van Nuys, Calif., assignors to The Marquardt Corporation, Van Nuys, Calif., a corporation of California Filed Nov. 1, 1954, Ser. No. 465,969

18 Claims. (Cl. 60—35.54)

This invention relates to a thrust reverser and more particularly to a thrust reverser for application to turbo jet engines, either with or without afterburners. More particularly, this invention relates to a device incorporating a movable shroud and aft nozzle section so that thrust reversal is obtained by opening up peripheral ports in the engine and simultaneously closing the variable area exhaust nozzle. Also the invention incorporates means for trimming the nozzle exit area to achieve maximum power at take-off independent of ambient temperature, to achieve area requirements for water-alcohol injection boost, and to achieve minimum cruise fuel consumption.

Reverse thrust is particularly desirable on landing since it provides greater margins of safety in landing procedures and eliminates the necessity of drag parachutes and high brake loads. During the landing approach, it is most desirable to have zero thrust with the engine turning at higher than idle speed since at idle speed there is an appreciable lag in regaining maximum thrust in the event the landing cannot be completed. Even at idle speed, high thrust engines will produce substantial thrust in landing which necessitates a flat glide angle and unnecessary length of runway. By the use of reverse thrust, the engine can continue to turn at higher than idle speed and the airplane can still approach at a high glide angle, and in the event of misjudgment in landing, power can be quickly regained in order to terminate the landing procedure.

After the airplane is on the ground, idle thrust still exists and since turbojet powered aircraft have little inherent drag, long landing runs are required under normal conditions and prohibitive long runs are required on icy runways. However, the reverse thrust available from the present invention is capable of braking the airplane in order to substantially reduce the landing runs. Also, there are conditions where reverse thrust is highly useful during flight of the aircraft, since reverse thrust can be used to obtain increased maneuverability and more accurate control of in-flight refueling speed.

The present invention also provides for trimming of the exhaust area. Most turbo jet engines require trimming of the exhaust area. With a fixed exhaust cone, the trim is made to obtain optimum performance as a function of average anticipated ambient conditions. While a fixed exhaust nozzle can be trimmed on the ground to correspond with the optimum for average anticipated flight conditions, the present invention provides a linkage for continual adjustment of the nozzle trim, either by the pilot or by automatic means as is desirable. By providing for area trim in flight, the present invention makes it possible to achieve minimum specific fuel consumption for given cruise thrust requirements. Also, the exhaust area trim is provided to meet the requirements for maximum engine thrust on takeoff, by compensating for ground temperature changes. While a fixed area nozzle can be set on the ground for minimum specific fuel consumption based on anticipated flight conditions, the variable area nozzle of this invention can compensate for changes in atmospheric conditions during flight. Thus, the nozzle can be used to keep the specific fuel consumption at a minimum at all times by providing for continuous adjustment of the nozzle trim and a maximum power setting can be obtained without sacrificing the cruise specific fuel consumption. Also, the small area change required for water-alcohol injection boost can be made during flight.

A novel feature of the present invention lies in the fact that the mechanism of the invention is located on the rear end of the jet engine so that the reverse thrust acts at a point having the least interference with the aircraft structural parts. The mechanism can be installed in the airplane structure so that no increase in external drag results during normal operations and also, the internal lines of the mechanism are such that during normal operation of the engine, there is no loss in thrust due to any internal drag or obstruction. The invention utilizes a movable shroud which is actuated by a power mechanism and upon movement of this shroud, a plurality of peripheral ports are opened up while the variable nozzle is simultaneously closed so that a portion of the exhaust of the engine passes through the peripheral ports in a reverse direction, thus causing thrust reversal. The greater the movement of the movable shroud, the greater will be the opening of the peripheral ports and the closing of the exhaust nozzle. The exhaust nozzle consists of segments and trim flaps which have a labyrinth seal therebetween during the time that the nozzle area is being trimmed. When the nozzle further restricts the exit area, exhaust gases will be able to escape between the nozzle segments, until the segments are closed down to a position approximately normal to the axis of the engine.

Two forms of the invention are illustrated and in the first form of the invention, a simple linkage mechanism is utilized to move the segments of the exhaust nozzle to close the exhaust area as the side ports in the wall of the engine are being opened. The first form of the invention is intended for use with an engine which operates either at maximum thrust with the nozzle open or in trim position, or at maximum reverse thrust with all of the peripheral ports opened and the nozzle closed to its maximum extent. In the second form of the invention, the exhaust nozzle area is closed in a manner to maintain a definite area change relationship between the exhaust area and the area of the reverse thrust ports. It is desirable to operate the reverse thrust independently of engine parameters, and in order to accomplish this result, the effective area of the peripheral ports plus the effective area of the exit nozzle in any position of the movable shroud must result in constant effective area. If this area relationship is maintained, reverse thrust can be obtained by opening the peripheral ports while maintaining a constant engine speed, total pressure, total temperature and mass flow. In order to accomplish the modulation of the exhaust nozzle, a linkage mechanism is provided which incorporates a cam having a contour which causes the nozzle segments which close the exhaust area to move in accordance with the increased opening of the peripheral ports. Thus, in the second form of the invention, it is possible to modulate the thrust of the engine from maximum forward thrust to maximum reverse thrust while the exhaust pipe total temperature and total pressure remain substantially and essentially unchanged.

It is therefore an object of the present invention to provide a thrust reverser which reverses the direction of a portion of the exhaust gases of the engine and at the same time closes the exhaust area.

Another object of the invention is to provide a reverse thrust device in which exhaust area trim is provided to obtain maximum thrust on takeoff and a minimum specific fuel consumption during flight.

A further object of the invention is to provide a reverse thrust unit which can control the thrust of the engine from maximum forward thrust to maximum reverse thrust by opening peripheral ports in the engine and by closing the exhaust nozzle.

A still further object of the invention is to provide a movable shroud on the exhaust end of a turbojet engine, which shroud carries a variable area exhaust nozzle connected by a linkage to the engine so that movement of the shroud will result in the opening of peripheral ports to obtain reverse thrust and in the closing of the nozzle in order to block the exhaust flow.

Another object of the invention is to provide a thrust reverser which is located at the left end of the engine so that the reverse thrust acts at a point having least interference with the aircraft structural parts.

Another object of the invention is to provide a reverse thrust unit which can be shaped to the contour of the airplane itself and which has internal lines such that during normal operation, there is no thrust loss due to internal drag and obstructions.

A further object of the invention is to provide a reverse thrust unit in which ports are opened in the side of the engine at the same time as a variable area exhaust nozzle is closed and in which the effective area of the ports plus the effective area of the nozzle in any position is maintained constant so that the unit can operate without affecting turbine discharge fluid parameters.

These and other objects of the invention not specifically set forth above will become readily apparent from the accompanying description and drawings in which:

Figure 2 is a vertical section similar to Figure 1 showing the movable shroud in its aft position to obtain maximum reverse thrust.

Figure 3 is a transverse vertical section along line 3—3 of Figure 1 illustrating one of the blockage segments of the nozzle in position for normal operation of the engine.

Figure 4 is a transverse vertical section along line 4—4 of Figure 1 illustrating one of the trim flaps of the nozzle in position for normal operation of the engine.

Figure 10 is a transverse vertical section along line 10—10 of Figure 7 showing the construction of the blockage segments and the trim flaps of the exhaust nozzle.

Figure 11 is a vertical section along line 11—11 of Figure 10 illustrating one of the segments in its position for normal operation of the engine.

Figure 12 is a vertical section along line 12—12 of Figure 10 illustrating one of the trim flaps in position for normal operation of the engine.

Figure 1:
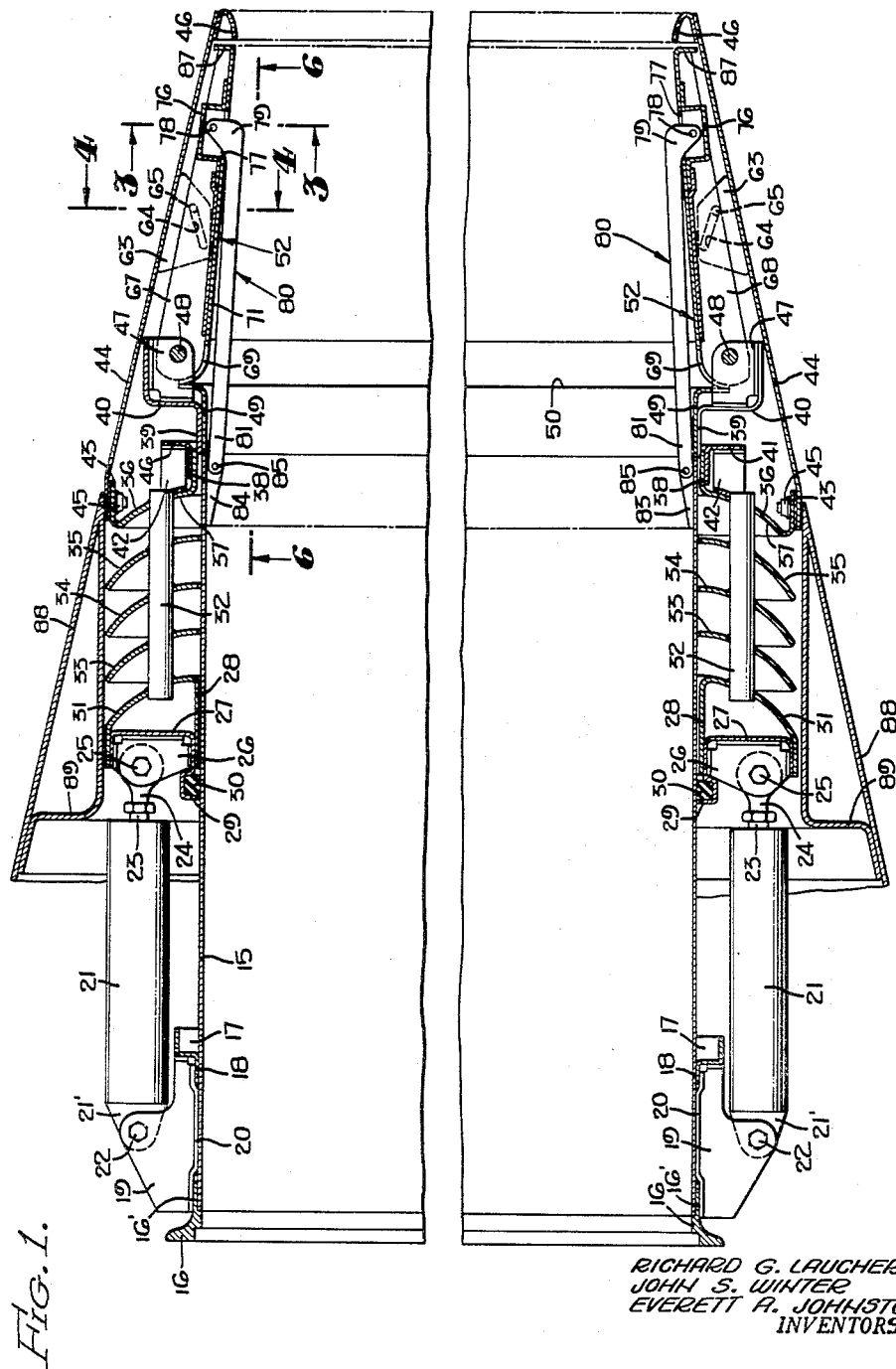
Figure 1 is a vertical section of the exhaust end of a turbo jet engine showing the movable shroud of the first form of the invention in position for normal flight.

Referring to the first form of the invention illustrated in Figures 1 and 2, the combustion chamber 15 of the engine is shown having an attachment ring 16 secured at one end by extension 16' in order to connect the combustion chamber to the forward parts of the engine. An annular member 17 having extension 18 surrounds the combustion chamber and is spaced rearwardly from attachment ring 16. Four brackets 19 are equally spaced around the circumference of the combustion chamber between the ring 16 and the member 17 and the bottom surface 20 of the brackets are secured to the combustion chamber by welding or other well-known methods. Each of the brackets 19 support one end of an actuating cylinder 21 by means of a pivot pin 22 passing through an extension 21' of each cylinder. Each of the actuating cylinders 21 has an actuating shaft 23 which carries an attachment 24 having an opening for receiving a pivot pin 25 carried by a bracket 26. This bracket is secured to annular member 27 in any suitable manner such as by clips or by welding. The annular member 27 is substantially C-shaped and is secured between the arms of a second annular member 28 which is slidably mounted on the surface of combustion chamber 15. An extension 29 of member 27 forms a container for the sealing ring 30 which prevents leakage of exhaust past the members 27 and 28 when the members are in their extended aft position. The surface 31 of member 28 is in the shape of a reversing vane, and a plurality of supporting rods 32 are secured to surface 31 by welding or any other suitable attachment. The rods 32 extend rearwardly and support three independent reversing vanes 33, 34 and 35 which are spaced apart to form exhaust ports for obtaining reverse thrust. The ends of rods 32 are secured to an annular bracket 36 which has a surface 37 of the same shape as the reversing vanes. With the reversing vanes in the position shown in Figure 1, the portion 38 of bracket 36 is adjacent the end of the combustion chamber 15 and is adjacent the end of portion 39 of a Z-shaped annular member 40. An annular bracket 41 is secured to portion 38 and is spaced axially from surface 37 by a spacing bracket 42. A second portion 43 of bracket 36 supports a movable, conical shroud 44 by means of a plurality of connections 45, and this shroud 44 extends to the aft end of the engine and carries a cap member 46 of the same width as the nozzle segments and flaps. The annular bracket 40 supports a plurality of brackets 47 located around the circumference of the engine and these brackets have openings to receive a hinge ring 48 for pivotally mounting the various elements of the variable area exhaust nozzle. A sealing bracket 49 is secured to portion 39 of annular member 40 and has a surface 50 which continually bears against the surface of the nozzle elements to prevent leakage of exhaust.

Figure 6:
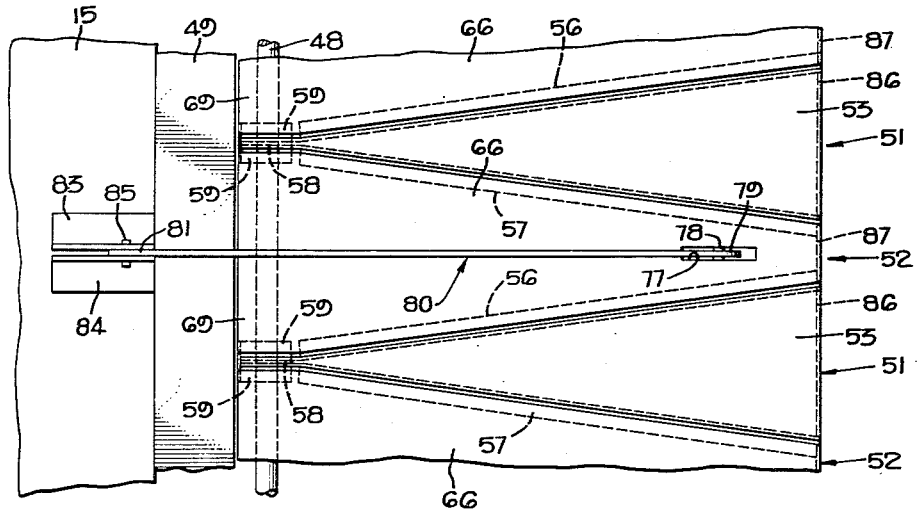
Figure 6 is a horizontal section along line 6—6 of Figure 1 showing the overlapping of the nozzle segments and flaps when in trim position.

The construction of the variable area nozzle which is supported by a hinge ring 48 will now be described. Referring to Figure 6, a section of the interior surface of the nozzle is illustrated in its maximum open position and the nozzle consists of a number of trim flaps 51 which are separated by blockage segments 52. Each of the trim flaps 51 have a flat surface 53 from which extend sides 54 and 55 having sealing flanges 56 and 57, respectively. The sides 54 and 55 converge at a point adjacent to hinge ring 48 and are separated by a plate 58 which carries a curved plate 59 extending oppositely from sides 54 and 55 in order to provide a seal between adjacent segments 52 at the hinge ring. The sides 54 and 55 and plate 58 have openings for receiving the hinge ring to thereby pivotally support the flap. The surface 53 of each flap carries a pair of spaced brackets 61 and 62 and each pair received therebetween a guide 63 carried by the movable shroud 44. Each guide 63 contains an incline slot 64 which receives a pin 65 carried by the brackets 61 and 62. As will be presently described, the movement of the shroud 44 will cause the pin 65 to move along the slot 64 and thus move the trim flaps 51. It is understood that the movable shroud 44 carries a guide 63 for each of the trim flaps 51.

Referring now to the construction of the blockage segments 52, each of the segments has a bottom surface 66 with sides 67 and 68. The wide end of each of the segments 52 is adjacent the hinge ring 48 and this end has a portion 69 which curves around the hinge ring and around the plate 59 of adjacent flaps 51. Each surface 66 carries a channel member 70 (see Figure 5) which has a bottom portion 71 secured to surface 66 and has sides 72 and 73. These sides have openings 74 and 75 in order to receive the hinge ring 48 and thus, pivotally mount each of the segments 52. It is pointed out that the curved portion 69 of each segment 52 overlaps the curved plates 59 of flaps 51 to obtain a seal between the ends of the flaps and segments. Also, as illustrated in Figures 3 and 4, the sides 67 and 68 of segments 52 are in contact with the flanges 56 and 57 of the flaps 51 in order to provide a labyrinth seal between these two members and prevent the exhaust gases from leaking through the nozzle when in closed position. Each surface 66 carries a box shaped member 76 which covers an opening 77 in the surface. A pin 78 extends through the sides of each member 76 and also passes through an opening in the end 79 of a lever 80. The other end 81 of each lever 80 is passed between brackets 83 and 84 which are secured to the inner circumference of the combustion chamber at its aft end and a pin 85 passes through the brackets and the end 81 of the lever in order to pivotally secure the lever. Thus, the end 81 of each lever 80 is secured to the combustion chamber, and the other end 79 is secured to a segment of the nozzle. The aft end of each flap 51 has an end piece 86 while the aft end of each segment 52 has an end piece 87, and these end pieces are of the same width as the cap 46, so that when the nozzle segments are in the wide open position, as illustrated in Figure 1, the surface of the nozzle and the cap give a uniform discharge area for the nozzle.

Referring now to the operation of the invention, the exit nozzle consisting of flaps 51 and segments 52 is shown in a wide open position in Figure 1 for maximum forward thrust operation of the engine. The actuating cylinders 21 position the movable shroud 44 forwardly so that the bracket 41 is adjacent the end of combustion chamber 15. The aircraft has a nacelle surface 88 which mounts an annular bulk head 89 to prevent the escape of exhaust gases into the surrounding aircraft structure. The movable shroud 44 is so shaped that it comprises a smooth extension of nacelle 88 when the shroud is in the forward position as illustrated in Figure 1. When the movable shroud 44 is in its forward position, the pin 65 will be in the aft section of the slot 64 and the trim flaps 51 will be in their maximum open position. Also, the segments 52 will be in their maximum open position since the pressure of the exhaust gases will force the sides of the individual segments 52 against the flanges 56 and 57 of flaps 51, and the exterior constructions of the nozzle will thus be sealed against the exhaust gases.

When it is desired to trim the exhaust nozzle of the present invention, the cylinders 21 can be operated to move the shroud 44 relative to the exhaust nozzle until the desired trim is obtained. The amount of movement available for trim purposes is represented by the distance between brackets 40 and 41 (see Figure 1) since the cylinders 21 will move both the shroud 44 and the nozzle after bracket 41 engages bracket 40. Within this range of trim movement, the bracket 36 will move shroud 44 and the bracket 63 relative to the trim flaps 51. Because of the angle of the slot 64, it is seen that aft movement of the shroud relative to the nozzle will cause the trim flaps 51 to be moved towards the center line of the engine. Also, this movement of the flaps 51 will be transmitted to the segments 52 through the flanges 56 and 57 which bear against the sides of the segments. Thus, the flaps 51 and segments 52 can be moved in unison by movement of the shroud 44 relative to the nozzle in order to trim the nozzle and select the nozzle area most suitable, and this trim adjustment can be changed from time to time through actuation of the cylinder 21 to move the shroud 44 either forwardly or rearwardly. The maximum trim position of flaps 51 is illustrated in Figure 2.

Figure 5:
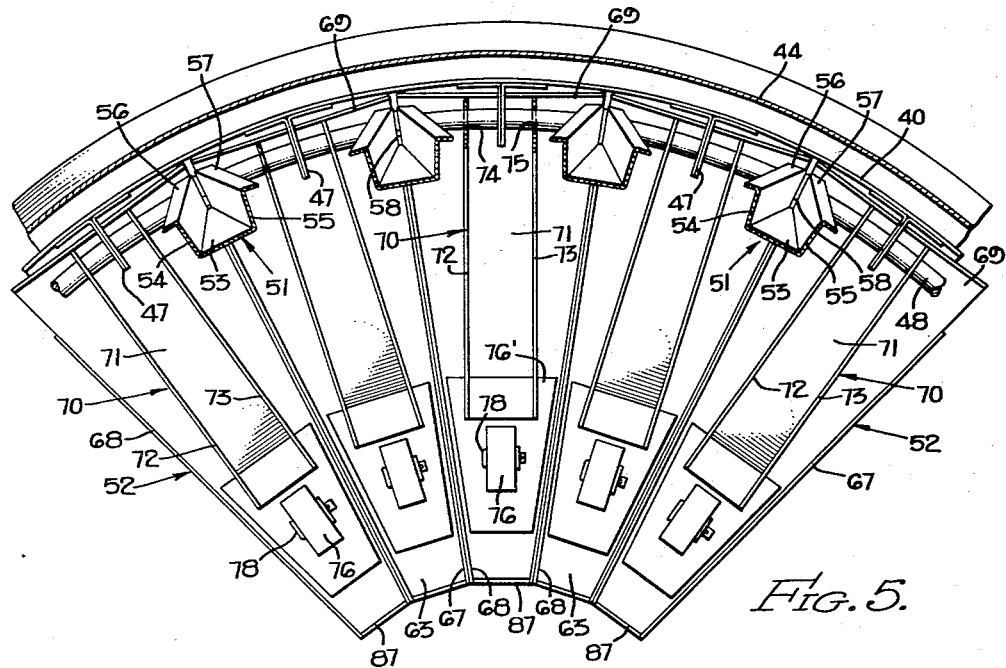
Figure 5 is a transverse vertical section along line 5—5 of Figure 2 showing the blockage segments and the trim flaps of the exit nozzle in position to obtain maximum reverse thrust.

When it is desired to block the thrust and obtain reverse thrust, the actuating cylinders 21 move the bracket 41 against the bracket 40 from any previous trim position, and after engagement of the brackets, further actuation of the cylinders will move both the shroud 44 and the nozzle elements rearwardly together. This unison movement rearwardly will cause the lever 80 to rotate the segments 52 about the hinge ring 48, while the trim flaps remain in maximum trim position. Also during this unison movement, the reversing surface 37 and vanes 33—35 will move one at a time beyond the end of combustion chamber 15 until reversing surface 31 becomes flush with the aft end of the combustion chamber. Also, the segments 52 will be moved to a position approximately normal to the axis of the engine so as to provide maximum blockage of the thrust. Thus, when the actuating cylinder 21 reaches the end of its stroke, the nozzle segments and the reversing vanes will be in the position illustrated in Figure 2 with the flaps 51 in the maximum trim position. The closed position of the nozzle segments 52 is illustrated in Figure 5 and the segments assume a side by side arrangement because of the shape of the segments 52. It will be understood that the segments 52 serve to block the exhaust at the end of the engine and to force the exhaust gases out through the openings between the reversing vanes, and because of the shape of the vanes, the reaction upon the engine will be in the opposite direction to that which is caused by the jet stream leaving the engine under normal conditions. Thus, the engine can be switched from full forward thrust to maximum reverse thrust by simply actuating the cylinders 21 to move the shroud 44 to its full aft position. It is apparent that partial thrust reversal can be obtained with this form of the invention in the event that only a part of the reversing vanes are exposed to the exhaust and the segments 52 are in an intermediate position to partially block the exhaust. It is contemplated that the engine can be controlled from maximum forward thrust to maximum reverse thrust almost instantaneously without reducing the speed of rotation of the engine.

Since a gap will exist between the segments 52 as they move away from the trim flaps 51 toward maximum blockage position, the cap 46 is provided to prevent an increase in exit area during this movement. Because of the shape of the reversing vanes and surfaces, the surfaces and vanes are closer together at the exit than at the entrance and thus form nozzles for exhaust gases which provide the reverse thrust. It is understood that the various components of the invention are fitted together and provided with necessary seals to prevent leakage of exhaust gas into the fuselage. The movable shroud 44 is streamlined with nacelle 88 so that no increase in external drag results and since levers 80 are positioned along the inner surface of the engine during normal operating conditions, there is practically no loss of thrust due to internal obstructions. By locating the reversing vanes at the rear end of the engine, reverse thrust is obtained at a point having the least interference with the aircraft structural parts.

Referring to the second form of the invention illustrated in Figures 7 through 14, the engine has a combustion chamber 90 which can be secured to a forward section of the engine in any desired manner. An annular bracket 91 is secured around the combustion chamber and supports an annular surface 92 spaced from the combustion chamber. A plurality of U-shaped members 93 are positioned between the aft end of the combustion chamber and surface 92 and each member pivotally mounts one end of a lever 94 by means of a pin 95 passing through the legs of the member. The surface 92 supports a Z-shaped annular bracket 96, which in turn supports a firewall 97 also connected to nacelle 98 so that the bracket 96 and firewall 97 serve to prevent the leakage of exhaust gases into the fuselage. A plurality of actuating shafts 99 projects through openings in bracket 96 and through sealing rings 100 carried by housing 101 secured to bracket 96. Twelve such actuator shafts are used and these shafts can be powered by hydraulic cylinders 21 in the manner illustrated in the first form of the invention. The actuator shafts 99 support a plurality of annular reversing vanes 102—108 and the vane 102 carries a bracket for holding a sealing ring 109 against the surface 92. The reversing vane 108 extends out to the surface of the nacelle 98 and is separated therefrom by a seal 110. A movable shroud 111 connects with the outer end of the reversing vane 108 and is so shaped as to be streamlined with the aircraft nacelle 98. An annular surface 112 connects with inner end of vein 108 and supports an annular Z-shaped member 113 which is positioned between shroud 111 and surface 112. A plurality of support brackets 114 project inwardly from the member 113 and have openings for supporting an annular hinge ring 115. The annular member 113 contains a plurality of openings each of which receive a collar 116 for supporting the hub of a gear 117. The hub of the gear 117 is threaded to receive a shaft 118 so that rotation of the gear 117 will move the shaft 118 longitudinally of the engine. A gripping member 119 is secured to the end of each shaft 118 by pin 120 and each of the members 119 grip a unison ring 121 which extends around the circumference of the engine.

Figure 13:
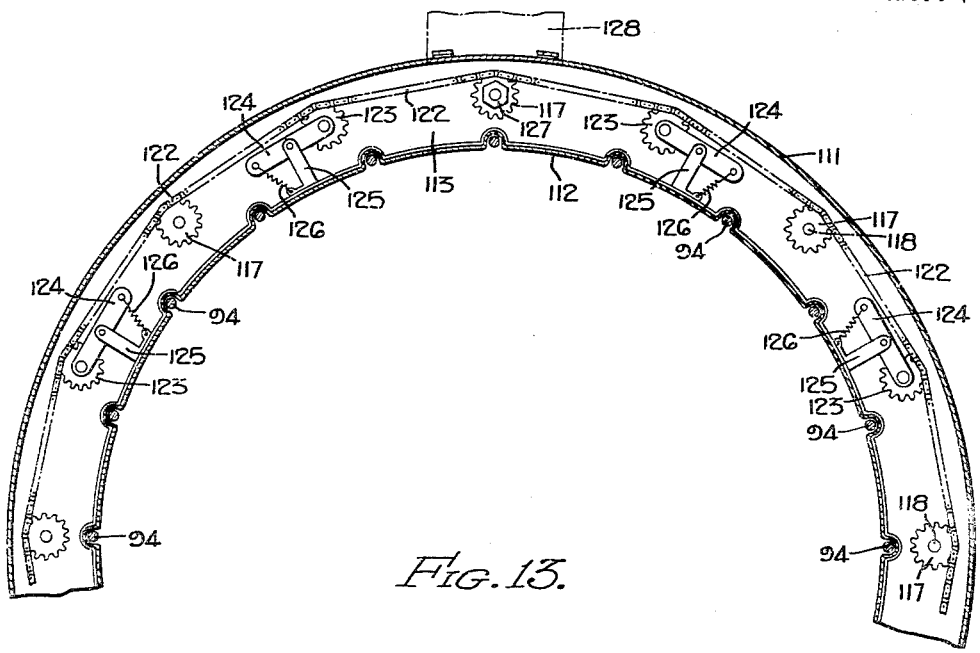
Figure 13 is a vertical section along line 13—13 of Figure 7 showing the mechanism utilized to trim the exhaust nozzle.
Figure 14:
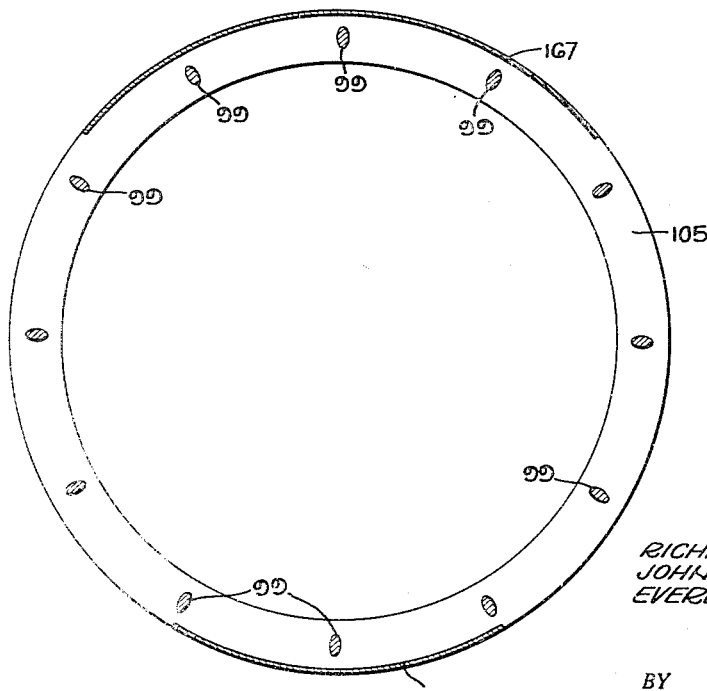
Figure 14 is a vertical section along line 14—14 of Figure 8 illustrating one of the reversing vanes and the blockage plates for protecting the aircraft structure.

Referring to Figure 13, a chain 122 passes completely around the engine and meshes with each of the gears 117. An idle gear 123 is positioned between each of the gears 117 and each idle gear is mounted on an arm 124 pivotally supported by a bracket 125 secured to bracket 113. A spring 126 connected between arm 124 and bracket 125 continually forces the idle gear 123 against the chain in order to guide and tighten the chain. The hub of one of the gears 117 is in the form of a nut 127 which is accessible through a door 128 hinged to the movable shroud 111. Thus, when the airplane is on the ground, the nut 127 can be manually adjusted to rotate chain 122 and move the shafts 118 and unison ring 121 either forwardly or rearwardly since rotation of the chain will rotate the gears 117.

The exhaust nozzle of the second form of the invention is comprised of a plurality of trim flaps 129 and a plurality of segments 130 which have the same outline as the flaps 51 and segments 52, respectively, as illustrated in Figures 5 and 6. Also, the construction of the forward ends of flaps 129 and segments 130 is the same as for flaps 51 and segments 52, respectively, so that the flaps 129 and segments 130 can be pivoted to hinge ring 115 and alternately spaced. The flaps 129 have a bottom surface 131 and sides 132 and 133 which carry flanges 134 and 135, respectively. Surface 131 mounts a bracket 136 which contains pin 137 for mounting roller 138 and 139 on opposite sides of the bracket. A pair of Z-shaped members 140 and 141 are secured to unison ring 121 at a position above each flap 129 and these members are spaced apart to receive the bracket 136 with rollers 138 and 139 positioned between the unison ring and portions 142 and 143, respectively, of members 140 and 141. Referring to Figure 12, the unison ring 121 and portions 142 and 143 are parallel and inclined with respect to the surface 131 so that when the unison ring is moved forwardly and rearwardly the flap 129 will move inwardly and outwardly about hinge ring 115 in order to trim the exhaust area.

Figure 7:
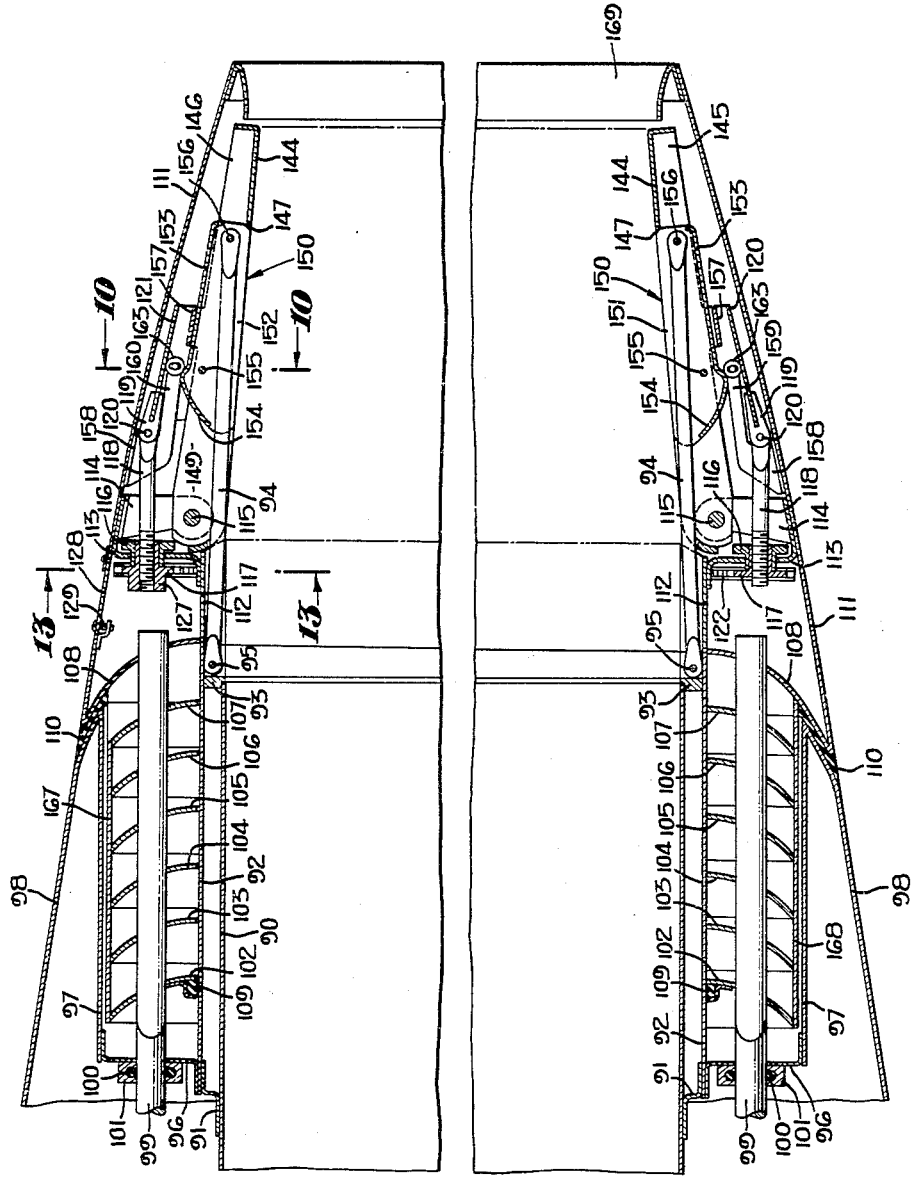
Figure 7 is a vertical section of a turbojet engine showing the movable shroud of the second form of the invention in normal operating position to obtain maximum forward thrust.

Referring to the segments 130, each segment has a surface 144 and sides 145 and 146. The surface 144 contains a slit 147 which extends from a rear position in the surface to the forward edge of the surface. Brackets 148 and 149 are positioned on opposite sides of slit 147 and extend along the length of the slit, the forward end of the brackets having openings for receiving hinge ring 115 which pivotally mounts the segments. A cam member 150 is normally positioned in the rear end of slit 147 as illustrated in Figure 11 and is composed of sides 151 and 152 and a connecting top surface 153 containing a cam shaped portion 154. The member 150 is pivotally mounted by a pin 155 which is supported by brackets 148 and 149 and the rear end of the member contains a pin 156 for pivotally connecting one end of arm 94 to the cam member. Arm 94 normally extends forward between the sides of the cam member and through the slit 147 in the surface of the segment as illustrated in Figure 7 and the end of the arm is secured by pin 95 in the manner previously described. A top cross member 157 connects brackets 148 and 149 and passes over surface 153 of the cam member. This cross member serves as a stop for the cam member and serves to limit the inward movement of the member as will later be described.

A number of angular members 158 are secured at one end to the shroud 111 and the other end of each member carries a fork having two arms 159 and 160. Each arm of the fork contains an oblong opening 161 which receives one end of a shaft 162 so that the shaft can move up and down relative to the fork. The shaft 162 supports a roller 163 having a central portion 164 of the same width as the cam surface 154 and having larger roller portions 165 and 166 positioned on opposite sides of the surface 154 and adjacent the arms 159 and 160 of the fork. During normal operation, the portion 164 is in contact with cam surface 154 and portions 165 and 166 are in contact with unison ring 121 as shown in Figures 7 and 10. Thus, as the unison ring 121 is moved forwardly and rearwardly by shafts 118, the roller 163 will move downwardly and upwardly relative to the arms 159 and 160 and since roller portion 164 is in contact with the cam surface, the segments 130 will move with the roller about hinge ring 115. The exhaust pressure will cause cam surface 154 to remain in continual contact with the roller 163 and the sides of segments 130 terminate adjacent the flanges 134 and 135 of flaps 129 to form a labyrinth seal and prevent exhaust from passing through the nozzle. It is therefore apparent that the unison ring 121 is utilized to trim the exit area of the nozzle by moving flaps 129 through rollers 138 and 139 and by moving segments 130 through roller 163 and cam members 150. Thus, the second form of the invention has all of the advantages previously discussed resulting from nozzle trim. During trimming of the nozzle, there is no relative movement between the roller 163 and the cam member, so that the cam member will be continually positioned on the initial portion of cam surface 154 in the manner illustrated in Figures 7 and 11.

Figure 8:
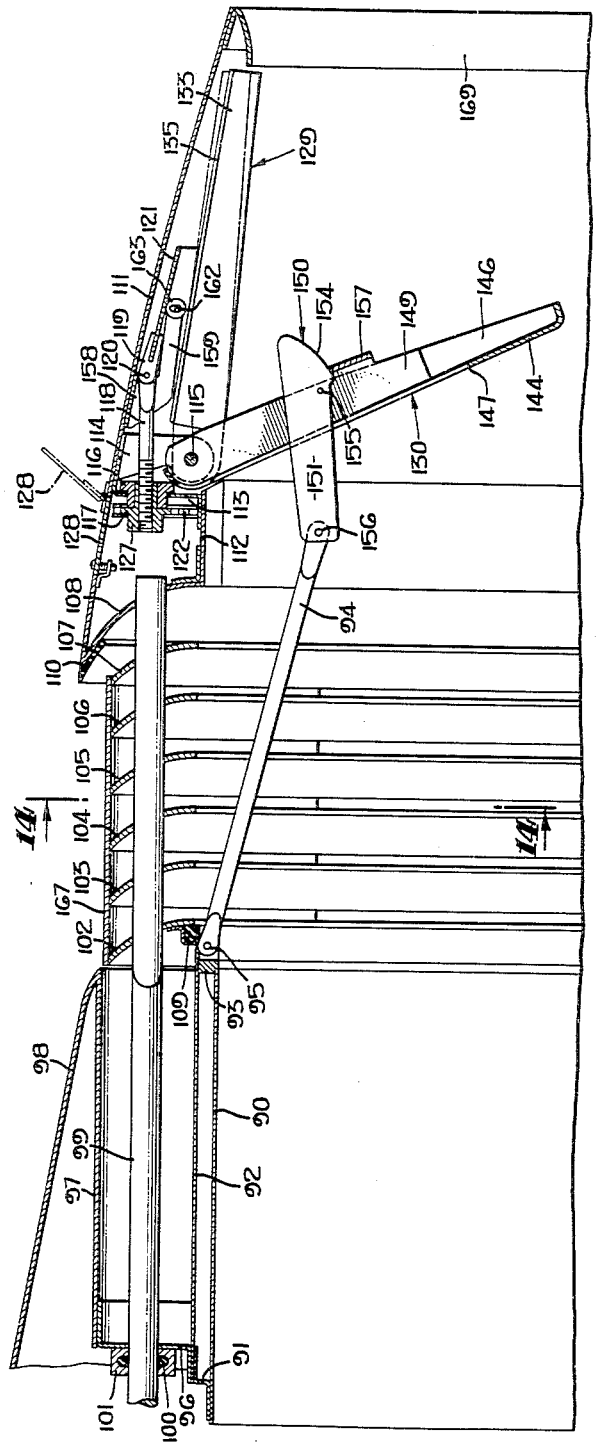
Figure 8 is a vertical section similar to Figure 7 showing the movable shroud of the second form of the invention in position for a maximum reverse thrust with the peripheral ports fully opened and the blockage segments closing the end of the nozzle.
Figure 9:
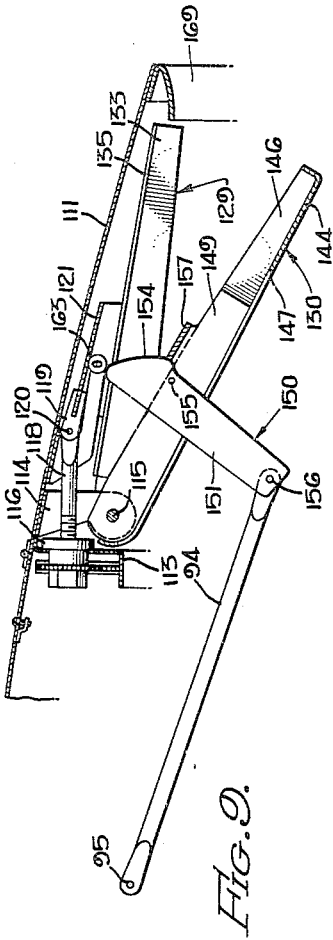
Figure 9 is a vertical section similar to that of Figures 7 and 8 showing the blockage segments of the nozzle in an intermediate position.

When it is desired to obtain reverse thrust, the shafts 99 are moved rearwardly in unison to move the shroud 111 and the reversing vanes 102—108 rearwardly so that the vanes can move one at a time past the end of combustion chamber 90 until vane 102 assumes a position adjacent the end of the combustion chamber as illustrated in Figure 8. At the same time, the hinge ring 115 will move rearwardly with the shroud and the flaps 129 remain in any given trim position. However, this rearward movement of the hinge ring will cause levers 94 attached to the combustion chamber to exert a pull on pins 156 and swing the aft end of the cam members 150 inwardly about pins 155. As each cam member 150 moves, the cam surface 154 will move along roller portion 164 to change the distance between roller 163 and pin 155, by which each segment 130 is attached to its cam member 150. As the forward end of each cam surface reaches roller 163, each segment 130 will be in the position illustrated in Figure 9 with the rearward end of the cam surface abutting the cross member 157 to prevent further rotation of the cam member relative to the segment. Thereafter, further movement of shroud 111 will move the cam surface away from the roller and will bodily move the segments and cam members inwardly until they assume the position illustrated in Figure 8, at which time all the reversing vanes are opened up.

The reversing vanes carry blockage plates 167 and 168 which serve to block exhaust from those positions of the vanes which would direct the exhaust against the aircraft structure and thereby damage the structure. Also, the tail end of the shroud has a cover plate 169 which serves to maintain a minimum effective area of the nozzle as the segments 130 move away from flaps 129 and thus create openings between the segments.

In the second form of the invention, it is possible to obtain reverse thrust independently of engine turbine discharge fluid parameters since it is possible to maintain the effective area of peripheral ports (vanes) plus the effective area of the exit nozzle a constant effective value and thus, reverse thrust can be modulated from maximum forward thrust to maximum reverse thrust. The effective area of the peripheral ports between the reversing vanes for any position of the shroud 111 can be determined, taking into account the area covered by the blockage plates. Also, the effective nozzle area for any given position of shroud 111 can be varied by varying the position of segments 130 and the amount of effective area blockage by the segments can be made equal to the effective open area of the vanes by properly contouring the cam surface 154. Thus, the contour of the cam surface will cause the segments 130 to move in a manner that will compensate for the open area of the vanes. At the time the cam surface moves away from roller 163 (see Figure 9), the engine will be at about zero thrust and further inward movement will cause reverse thrust to result until maximum reverse thrust is obtained with the segments in the position illustrated in Figure 8. While the cam surface 154 does not modulate the area blockage of the nozzle during the reverse thrust range, the linkage consisting of arm 94, cam member 154 and segment 130 is capable of maintaining the desired area change relationship between the vanes and the nozzle during reverse thrust. Thus, through the range from maximum forward to maximum reverse thrust, the total effective area in the aft end of the engine can be held constant so that thrust modulation is available within this range without substantially changing the exhaust pipe total temperature and total pressure.

By the present invention, a thrust reverser has been provided having a variable area nozzle for trimming the exhaust area and a plurality of reversing vanes defining peripheral ports which are simultaneously opened as segments of the nozzle move to block the exhaust area. It is understood that area trim can be accomplished in the second form either manually as described or by power means controlled by the pilot, while area trim is accomplished in the first form by activation of the power cylinders by the pilot. Thus, in either form of the invention, area trim can be accomplished on the ground or in flight. Each form of the invention has a movable shroud which mounts the variable area nozzle for movement relative to the combustion chamber and this relative movement will provide an open area for the reversing vanes and, at the same time, will pull segments of the nozzle inwardly to block a portion of the nozzle area. The linkage of the second form provides for thrust modulation by maintaining a constant effective open area at the aft end of the engine. It is understood that various other types of linkages can be utilized to move the blocking nozzle segments as the reversing vanes are opened. The linkages described have the advantage that in normal operation of the engine, they do not project into the exhaust stream and therefore do not substantially affect the internal drag of the engine. Because of the fact that the movable shroud is located on the aft end of the engine, the shroud can be streamlined to adjacent structure and the reverse thrust is obtained at a point having the least interference with the aircraft structural parts. While the reversing vanes of both forms of the invention result in a unique nozzle configuration for the exhaust, it is also possible to construct the vanes of airfoil sections. Also, the unison ring 121 of the second form could be omitted if the feature of nozzle trim is not utilized or required. The invention is not limited to any number or particular size of reversing vanes and, of course, the spacing between the vanes can be changed to change the size of the peripheral ports. It is understood that the hydraulic actuation cylinder for moving the vanes can be replaced with electric linear actuators, pneumatic actuators or other equivalent actuating devices. Various other modifications of the invention are contemplated by those skilled in the art without departing from the spirit and scope of the invention as hereinafter defined by the appended claims.

What is claimed is:

1. A thrust reverser for an engine having a combustion chamber with an exhaust nozzle comprising a shroud located at the aft end of said engine and connected with a plurality of spaced reversing vanes for movement therewith longitudinally of said engine, said shroud being positioned during forward thrust to close the periphery of said engine, means for moving said vanes and shroud rearwardly from the forward thrust position to form a peripheral opening in said engine opposite said reversing vanes, and movable blockage means supported by said shroud in open position and located entirely within the interior circumference of said shroud and forming an extension of said combustion chamber parallel to said combustion chamber when said shroud is in the forward thrust position, and means operable upon rearward movement of said shroud for moving said blockage means inwardly to reduce the interior opening of said shroud and thereby cause exhaust gas to flow through said peripheral opening and reversing vanes.

2. A thrust reverser as defined in claim 1 wherein said blockage means comprises a plurality of movable elements supported by said shroud, said moving means comprising means for connecting each of said elements to said engine forwardly of said shroud, the rearward movement of said vanes and shroud causing said connecting means to move said elements inwardly to reduce the interior opening of said shroud.

3. A thrust reverser as defined in claim 2 having flap means cooperating with said elements when the engine periphery is closed to form a variable area exhaust nozzle, and means for varying the area of said nozzle in order to trim the nozzle area.

4. A thrust reverser for an engine comprising a shroud connected with a plurality of spaced reversing vanes for movement therewith longitudinally of said engine, said shroud being positioned during forward thrust to close the periphery of said engine, a variable area exhaust nozzle positioned within said shroud and comprised of a plurality of trim flaps and a plurality of segments, said segments being connected by linkage means to said engine forwardly of said shroud, means for moving said flaps and segments while the periphery of said engine is closed in order to trim said nozzle, and means for moving said shroud and vanes rearwardly of said engine to move said vanes over the peripheral opening in said engine resulting from rearward movement of said shroud, said rearward movement causing said linkage means to move said segments to block the nozzle opening and thereby producing reverse thrust flow through said vanes.

5. A thrust reverser as defined in claim 4 wherein said means for moving said flaps and segments comprises cam means carried by said shroud and follower means carried by said flaps, said shroud being mounted for longitudinal trim movement relative to said flaps and said engine while the periphery of said engine is closed.

6. A thrust reverser as defined in claim 4 wherein said shroud mounts a unison ring for movement longitudinally of said engine, and means for connecting said ring to said flaps to trim the area of said nozzle upon movement of said ring.

7. A thrust reverser as defined in claim 4 wherein said linkage means moves said segments to block the area of said nozzle to maintain the effective area of said nozzle plus the effective area of said peripheral opening a constant effective area for any rearward position of said shroud.

8. A thrust reverser as defined in claim 7 wherein said linkage means comprises cam means pivotally connected to said segments for rotation relative to said segments upon rearward movement of said shroud and means fixed to said shroud and cooperative with said cam means to move said segments inwardly an amount determined by the contour of said cam.

9. A thrust reverser as defined in claim 4 wherein said reversing vanes are shaped to form a plurality of nozzles for the exhaust passing through said opening to provide reverse thrust.

10. A thrust reverser for an engine comprising first means forming a part of the engine during operation of said engine to produce forward thrust, second means for moving said first means rearwardly to form a peripheral opening in said engine, third means positioned at said opening to produce reverse thrust, and blockage means supported by said first means and located within said first means in open position when the periphery of said engine is closed during forward thrust, said blockage means comprising a plurality of surfaces located substantially parallel to and extending rearwardly along the interior of said first means to form at least a portion of the internal engine surface within said first means during forward thrust, means for pivotally connecting the forward end of each surface to said first means, and means pivotally connected to said blockage means and to said engine forwardly of said first means and operable upon rearward movement of said first means for moving said blockage means inwardly to reduce the interior opening of said first means.

11. A thrust reverser for an engine comprising a shroud positioned behind and connected to a plurality of spaced reversing vanes for movement with said vanes longitudinally of said engine, said shroud being in its forward position to close the periphery of said engine during production of maximum thrust by the engine, means for moving said vanes and shroud rearwardly to form a peripheral opening in the engine forward of said shroud and to move said vanes over said opening to provide a plurality of peripheral ports in said engine for the escape of engine exhaust, a variable area nozzle positioned within said shroud and comprised of a plurality of pivotally mounted trim flaps and segments alternately positioned, said shroud being movable relative to said nozzle during the initial portion of the rearward movement without forming a peripheral opening in said engine, and means connecting said shroud to the trim flaps of said nozzle to trim said nozzle during the initial portion of rearward movement of said shroud.

12. A thrust reverser as defined in claim 11 having means for bodily moving said nozzle with said shroud during rearward movement of said shroud beyond said initial portion of rearward movement and means for connecting said segments to said engine so that bodily movement of said nozzle moves said segments to block the area of the nozzle as said vanes move over the peripheral opening formed in said engine.

13. A thrust reverser for an engine comprising a shroud positioned behind and connected to a plurality of spaced reversing vanes for movement with said vanes longitudinally of said engine, said shroud being in its forward position to close the periphery of said engine during production of maximum thrust by the engine, means for moving said vanes and shroud rearwardly to form a peripheral opening in the engine forward of said shroud and to move said vanes over said opening to provide a plurality of peripheral ports in said engine for the escape of engine exhaust, a variable area nozzle carried by said shroud for movement therewith and comprised of a plurality of pivotally mounted trim flaps and segments alternately positioned, a unison ring carried by said shroud and selectively movable relative to said nozzle and means connecting said ring to said nozzle to trim the area of said nozzle upon relative movement between said nozzle and ring.

14. A thrust reverser as defined in claim 13 having means for connecting said segments to said engine so that rearward movement of said shroud and nozzle moves said segments to block the area of the nozzle as said vanes move over the peripheral opening formed in said engine by said rearward movement.

15. A thrust reverser as defined in claim 14 wherein said connecting means between said segments and said engine comprises a cam linkage means pivotally connected at one end to said segments and at the other end to said engine through lever means, said linkage means having a cam surface cooperating with a stationary member carried by said shroud in order to pivot said segments inwardly at a rate such that the effective area of said nozzle plus the effective area of said peripheral opening for any rearward position of the shroud results in a constant effective area.

16. A thrust reverser for a jet engine comprising first means forming a shroud in the form of a continuous section of said engine during operation of the engine to produce forward thrust, second means for moving said first means rearwardly to form a peripheral opening in said engine, reversing vane means connected with said first means for movement over said peripheral opening formed by movement of said first means, blockage means connected with said first means interiorly thereof and movable inwardly from said first means upon rearward movement of said first means for reducing the opening in said first means at a position aft of said peripheral opening in order to block the flow through said first means, said blockage means being moved inwardly by linkage means connected with said blockage means and with said engine at a position forward of said peripheral opening so that the major part of the blockage load on said blockage means is transmitted to said engine through said linkage means, said blockage means comprising a plurality of elements each having a surface substantially parallel to and extending rearwardly along the interior surface of said first means when said first means is in said forward position, means for pivotally connecting the forward end of each element to said first means, and said linkage means being pivotally connected to said elements rearwardly of said connecting means and to said engine in order to rotate said elements inwardly about said connecting means upon rearward movement of said first means.

17. A thrust reverser as defined in claim 16 wherein said linkage means includes cam means for moving said elements inwardly about said connecting means at a rate to maintain the effective area of said first means plus the effective area of said peripheral opening at a constant effective value during rearward motion of said first means.

18. A thrust reverser for a jet engine comprising an engine section, shroud means abutting said engine section and forming a rear continuous portion of said engine during operation of the engine to produce forward thrust, means for moving said shroud means rearwardly to form a peripheral opening in said engine, reversing surfaces movable into position over said opening to direct the flow therethrough, blockage means movably supported by said shroud means and forming at least a portion of the internal engine surface within said shroud means when said shroud means is in position for forward thrust, and means operable upon rearward movement of said shroud means for moving said blockage means inwardly to reduce the flow area internally of said shroud means and cause flow through said opening.

References Cited in the file of this patent

UNITED STATES PATENTS

| | | |
|---|---|---|
| 2,418,488 | Thompson | Apr. 18, 1947 |
| 2,620,623 | Imbert | Dec. 9, 1952 |
| 2,637,164 | Robson et al. | May 5, 1953 |
| 2,753,684 | Greene | July 10, 1956 |
| 2,797,548 | Marchal | July 2, 1957 |

FOREIGN PATENTS

| | | |
|---|---|---|
| 524,592 | Belgium | Dec. 15, 1953 |
| 56,672 | France | July 23, 1952 |
| 1,020,287 | France | Nov. 12, 1952 |
| 244,761 | Switzerland | June 2, 1947 |